US008567076B2

(12) United States Patent
Ortleb et al.

(10) Patent No.: US 8,567,076 B2
(45) Date of Patent: Oct. 29, 2013

(54) GEODETIC TARGET FOR A GEODETIC INSTRUMENT

(75) Inventors: Rudolf Ortleb, Kahla (DE); Christian Graesser, Vallentuna (SE); Anneli Utterbaeck, Rimbo (SE)

(73) Assignee: Trimble Jena GmbH, Jena (DE)

( * ) Notice: Subject to any disclaimer, the term of this patent is extended or adjusted under 35 U.S.C. 154(b) by 238 days.

(21) Appl. No.: 13/109,172

(22) Filed: May 17, 2011

(65) Prior Publication Data

US 2012/0124850 A1 May 24, 2012

(30) Foreign Application Priority Data

Jun. 16, 2010 (DE) .......................... 10 2010 024 014

(51) Int. Cl.
*G01C 15/06* (2006.01)
(52) U.S. Cl.
USPC .............................................. 33/228; 33/293
(58) Field of Classification Search
USPC ............................. 33/293, 228, 294, 295, 296
See application file for complete search history.

(56) References Cited

U.S. PATENT DOCUMENTS

| 5,983,511 | A * | 11/1999 | Osaragi et al. .................. 33/293 |
| 6,185,055 | B1 * | 2/2001 | Feist ................................ 33/293 |
| 6,384,907 | B1 | 5/2002 | Gooch |
| 6,665,067 | B2 * | 12/2003 | Ogawa et al. ................. 356/247 |
| 7,184,151 | B2 | 2/2007 | Clarke et al. |
| 7,661,199 | B2 * | 2/2010 | Marsh et al. ..................... 33/293 |
| 7,804,051 | B2 * | 9/2010 | Hingerling et al. ............. 33/293 |
| 7,818,889 | B2 * | 10/2010 | Bernhard et al. ................ 33/293 |
| 7,913,405 | B2 * | 3/2011 | Berg et al. ........................ 33/293 |
| 2008/0004808 | A1 | 1/2008 | Johnson et al. |
| 2010/0107429 | A1 * | 5/2010 | Berg et al. ........................ 33/228 |
| 2012/0124850 | A1 * | 5/2012 | Ortleb et al. .................... 33/228 |
| 2012/0198712 | A1 * | 8/2012 | Hinderling et al. ............. 33/292 |

FOREIGN PATENT DOCUMENTS

| DE | 102009014782 B3 | 9/2010 |
| JP | 9014965 A | 1/1997 |
| JP | 10307025 A | 11/1998 |

(Continued)

OTHER PUBLICATIONS

Wikipedia "Electronic paper", http://en.wikipedia.org/wiki/Electronic_paper, 10 pages.

(Continued)

*Primary Examiner* — Yaritza Guadalupe-McCall
(74) *Attorney, Agent, or Firm* — Kilpatrick Townsend & Stockton LLP (57) ABSTRACT

A geodetic target for use in geodesy includes a support, a measuring target supported by the support, an identifier supported by the support, and a controller. The identifier includes at least one identification element that is configured to be switchable between at least two optical states and has a first predetermined optical property in one optical state and does not have the first predetermined optical property in a further optical state. The controller is configured to change the state of the at least one identification element. A geodetic measurement instrument includes an identifier detection unit, a measuring unit, and a transmitter configured to address a receiver of the geodetic target and to transmit control commands to the same which effect the change of the optical state of the at least one identification element of the identifier of the geodetic target. A system includes the geodetic measurement instrument and geodetic target.

34 Claims, 6 Drawing Sheets

(56) References Cited

FOREIGN PATENT DOCUMENTS

| JP | 2002131054 A | 5/2002 |
|----|--------------|--------|
| JP | 2004212283 A | 7/2004 |
| WO | WO 92/16817 A1 | 10/1992 |
| WO | WO 2008/014813 A1 | 2/2008 |
| WO | WO 2008/145158 A1 | 12/2008 |

OTHER PUBLICATIONS

Office Action issued by GPTO dated Dec. 21, 2010 for Application No. De 10 2010 024 014.1, 3 pages.
Office Action of Chinese Patent Application No. 201110160017.X, mailed Apr. 15, 2013, 8 pages.

* cited by examiner

GEODETIC TARGET FOR A GEODETIC INSTRUMENT

CROSS-REFERENCES TO RELATED APPLICATIONS

The present application claims priority to German Patent Application No. DE 10 2010 024 014.1, filed Jun. 16, 2010, entitled "Target for a geodetic instrument," the contents of which is hereby incorporated by reference in its entirety.

BACKGROUND OF THE INVENTION

1. Technical Field

The present application relates to the measurement of objects with respect to their position and dimension, in particular, to geodetic measurements. The invention relates, in particular, to a geodetic target for use together with a geodetic measurement instrument for performing geodetic measurements.

2. Brief Description of the Prior Art

In geodetic measurement instruments, measurement is frequently performed with respect to a geodetic target disposed at a distance from the measurement instrument. Examples of geodetic measurement instruments are theodolites, tachymeters (total stations) (particularly video tachymeters), leveling instruments (levelers) and laser scanners. The present application is, however, not limited to such kinds of measurement instruments. The geodetic target may be a natural target, such as a landmark (for example a soil formation, building, tree, etc.) or an artificial target (for example a surveying or leveling rod, a reflector etc.). Locating the geodetic target may be performed manually by a user or automatically by the measurement instrument. An automatic locating and, if required, tracing of the geodetic target is also referred to as "tracking". An automatic locating and tracing of a geodetic target is, in particular, performed if the geodetic target is not stationary and thus mobile (for example a vehicle used on a construction site or in a mine with or without artificial geodetic target mounted thereto, a surveying rod supported by a user, etc.).

As far as artificial geodetic targets are concerned, a distinction can be made between so-called passive and so-called active geodetic targets.

In the case of passive geodetic targets, either the measurement instrument detects an image of the geodetic target itself, or the measurement instrument emits radiation that is reflected by the passive geodetic target and detected by the measurement instrument. Examples of passive geodetic targets are surveying and leveling rods, as well as reflectors (particularly retroreflectors). Examples of reflectors are prisms, retroreflectors or triple prisms. An example of a geodetic measurement instrument making use of a passive geodetic target is disclosed in WO 2008/014813 A1.

In order to render passive geodetic targets distinguishable from one another U.S. Pat. No. 6,384,907 proposes that each geodetic target comprises a sub target for measuring purposes and plural sub targets for identification purpose. The sub targets have different colors for identification purposes and a fixed spatial relation to the sub target for measurement purposes.

In case of active geodetic targets, radiation is emitted by the geodetic target itself, which is received by the measurement instrument. The radiation emitted by the active geodetic target may have a pattern (for example modulation of frequency or amplitude, embedding of analog or digital information, etc.) that renders the radiation emitted by the active geodetic target distinguishable from other radiation of the same kind.

An example of an active geodetic target that can be used in connection with a measurement instrument is disclosed in WO 2008/145158 A1.

U.S. Pat. No. 7,184,151 B1 proposes to provide a geodetic target with plural active or passive sub targets that differ from one another in intensity and/or size. This renders plural geodetic targets distinguishable from each other.

From WO 92/16817 it is known to selectively activate an active geodetic target from outside. A sequential activation thus allows distinguishing between several active geodetic targets.

It has been found that geodetic targets can still be further improved in order to be reliably detectable by a measurement instrument detecting the geodetic target and to be distinguishable by the measurement instrument from other geodetic targets.

SUMMARY OF THE INVENTION

The present invention was made in light of the problems described above.

Embodiments of the invention provide a geodetic target that can be reliably distinguished from other geodetic targets by a geodetic measurement instrument and, at the same time, exhibits a great flexibility with respect to features that can be used by the measurement instrument for determining the identity of the geodetic target. Further embodiments provide a geodetic target for geodetic measurement instruments that allows interacting with the measurement instrument for determining the identity of the geodetic target.

Such geodetic targets are very well suited for automatic detection by geodetic measurement instruments.

It is emphasized that, in the present application, the terms "geodesy" and "geodetic" are not limited to the scientific discipline that deals with the measurement and representation of the surface of the earth and the seafloor, but relate in a broad sense to measuring, surveying and position determining of objects.

According to embodiments, a geodetic target for use in geodesy comprises a support, a measuring target supported by the support, an identifier supported by the support, and an electric or electronic controller. The identifier includes at least one identification element. The support and the identifier may be separate elements, but they can also be formed by one common element.

According to embodiments, the support is a rod, a plate or a cylinder, which are formed in particular of solid material, such as, for example, metal, wood or plastic material. Alternatively, the support may, however, also be the object to be measured itself, such as, for example, a vehicle or a building or a landmark.

The at least one identification element can be switched between at least two optical states in which the identification element has different predetermined optical properties. Accordingly, the identification element has a first predetermined optical property in one optical state, and in another optical state the identification element does not have this first predetermined optical property but another predetermined optical property. For example, the at least one identification element may have a first optical state, in which radiation with a first wavelength or polarization is emitted, and at least another optical state, in which radiation of the first wavelength or polarization is not emitted. According to another example, the at least one identification element may have a first optical state, in which a first wavelength or polarization of received radiation is reflected or absorbed, and at least another optical state, in which radiation of the first wavelength or polarization is not reflected or absorbed. The emission of radiation of the first wavelength or polarization by the at least one identification element may, for example, be caused by an emission or polarization of radiation produced in the identification element itself or by a reflection, absorption or polarization of radiation incident on the identification element. In other words, the at least one identification element may, for example, have at least a first optical state in which radiation of a first wavelength or first polarization is produced in the identification element and emitted, and the at least one identification element furthermore has at least another optical state in which radiation of a wavelength or polarization different from the first wavelength or first polarization, respectively, is produced in the identification element and emitted, so that at least one of the shape, figure, size or color of a representation of the geodetic target changes from the viewpoint of the geodetic instrument. According to another example, the at least one identification element may, for example, have at least a first optical state in which a first wavelength or first polarization incident on the identification element is reflected or absorbed, and the at least one identification element furthermore has at least another optical state in which radiation of a wavelength or polarization different from the first wavelength or first polarization, respectively, incident on the identification element is reflected, polarized or absorbed so that at least one of the shape, figure, size or color of a representation of the geodetic target changes from the viewpoint of the geodetic instrument. For example, the predetermined optical properties of the at least one identification element may comprise different colors, intensities, luminances, or polarizations. The different predetermined optical properties of the at least one identification element are, however, not limited thereto, but may—at the same wavelength or same polarization or both same wavelength and polarization—also comprise different embedded codes.

The controller is configured to define and selectively change the optical state of the at least one identification element. The controller may be a switch array, a jumper array, relay array with keyboard or a correspondingly configured microcontroller, for example.

The structure of the geodetic target described above allows selectively imparting an identity to the geodetic target which is distinguishable from other geodetic targets in a flexible way in that a change is made to the optical state of the at least one identification element by using the controller. This allows to (successively) impart to one and the same geodetic target different identities and thus to use the geodetic target with particular flexibility. Furthermore, the identifier of a geodetic target can thus be adapted to different measurement conditions (for example visibility conditions, distances, etc.). As long as the identification elements of the identifier can be detected unambiguously, it is also possible to determine a twist or inclination of the geodetic target relative to a geodetic measurement instrument. This can be achieved by comparison of the spatial position of the identification elements detected by the geodetic measurement instrument with the pre-known spatial position of the identification elements relative to one another. This can be performed in order to take the twist or inclination of the geodetic target into account in processing a measurement result and, if required, to correct the orientation of the geodetic target. Moreover, a rough estimation of the distance from the geodetic target is possible as long as the identification elements of the identifier can be detected unambiguously and the spatial position of the identification elements relative to one another is pre-known. This can be achieved by comparison of the spatial position of the identification elements detected by the geodetic measurement instrument with the pre-known spatial position of the identification elements relative to one another.

According to embodiments, the at least one identification element is an indicator operating according to the principle of electrophoresis, electrowetting or micromechanically controlled interferometric modulation, a bistable LCD or a light-emitting diode, in particular an organic light-emitting diode. These components have particular low energy consumption. In some of these components, a supply of energy is only required to change the optical state of the identification element, i.e., the optical state of the identification element is maintained without energy supply. Therefore, the geodetic target requires no or only a small energy source of its own, which may be of advantage for a mobile use of the geodetic target. The different identification elements of the identifier may be identical components or different components.

According to an embodiment, the at least one identification element is a discrete, spatially confined, radiation emitting element, in particular a spotlight radiation source, such as, for example, a light-emitting diode, incandescent lamp, glow lamp (neon lamp) or a laser.

According to a further embodiment which can be combined with the embodiment described hereinbefore, the at least one identification element is formed by one or more pixels of a pixel matrix. In this case, the at least one identification element is composed of a plurality of identification sub-elements (pixel), wherein the main propagation direction of the radiation emitted, reflected, polarized or absorbed by the respective identification sub-elements (pixel) extends substantially in parallel. In this context, the term "substantially in parallel" is to be understood to the effect that the respective main propagation directions of the individual identification sub-elements (pixel) enclose an angle of not more than 20°, particularly not more than 10°, and more particularly not more than 5°. A pixel matrix is, in particular, understood to be a monitor screen/display or a matrix indicator (e.g. dot matrix display or segment display) composed of a plurality of pixels, the pixels having two or more optical states. Besides the optical states "ON" (emission/transmission of radiation) and "OFF" (no emission/transmission of radiation), this may mean, for example, that in different optical states the pixel are capable of emitting, reflecting, polarizing or absorbing radiation of different wavelength and thus color.

According to embodiments, the measuring target is a reflector and, in particular, one of a prism, a retroreflector, a retroreflecting foil or a triple mirror array, and thus a passive element. A coating of the support or identifier may also form the measuring target, for example. Alternatively, the measuring target may also be active and, for example, be formed by a radiation source for emitting measuring radiation. The measuring target may be spaced apart from the at least one identification element of the identifier or it may coincide with the same. Furthermore, the measuring target may be supported directly by the support or mounted to the identifier and connected via the same to the support. The present invention is, however, not limited to these examples. For example, the measuring target may be any arbitrary target with respect to which a measurement is possible.

According to embodiments, the geodetic target comprises at least two, particularly at least three, and more particularly at least eight identification elements disposed spaced apart from each other. The number of identification elements may be even or uneven. The measuring target may then be disposed on a connecting straight line and, in particular, in the center between two identification elements, for example. Furthermore, the measuring target may then be disposed in the centroid of a regular area, the corner points of which are being defined by the identification elements, for example. This allows determining the spatial position of the measuring target on the basis of the identification elements with particular ease. However, it is generally sufficient for the measuring target to have a pre-known spatial position relative to the at least one identification element, which pre-known spatial position may be the same or different for different optical states of the at least one identification element. The identification elements may be spaced apart from the measuring target at equal distance in pairs, which is, however, not compulsory. Furthermore, the identification elements may be disposed along a circle or in the corners of a regular polygon, in particular of a regular polygon, such as, for example, a triangle, in particular an equal-legged triangle, a square or a cuboid. This is, however, only optional.

According to embodiments, the identification elements are positioned such that they form at least two geometric figures that differ from each other only in size. According to one embodiment, the identification elements alternatively or additionally are arranged regularly. For example, the identification elements may be distributed regularly across a predetermined area. Furthermore, the controller may then be configured to change the optical state of plural identification elements simultaneously such that the identification elements having the same optical state selectively form geometric figures that differ from each other in at least one of shape or size.

In particular, these geometric figures may be two-dimensional and regular or irregular. The figures may have the same centroid, so that the smaller figure is positioned within the larger figure. However, this is only optional.

According to embodiments, the geodetic target furthermore comprises an addressable receiver which receives control commands, for example via an air interface, and supplies the control commands to the controller, the control commands causing the change of the optical state of at least one identification element of the identifier. The air interface may, for example, be radio based (transmission of electromagnetic waves), infrared based or sonic based, but the present invention is not limited thereto. The addressability of the receiver can be effected in a digital manner by assignment of a digital address or in an analog manner by assignment of a specific frequency, for example.

Accordingly, the geodetic target can be caused from outside (and thus remotely) to change the optical state of the at least one identification element and thus the identity of the geodetic target. On the one hand, this allows adapting to different measurement conditions (for example to a partially covered identifier, large spatial distance between geodetic measurement instrument and geodetic target or the like) and, on the other hand, the geodetic target can thus supply a response to the geodetic measurement instrument to confirm the identity of the geodetic target.

According to embodiments, a geodetic measurement instrument comprises an identifier detection unit, a measuring unit and a transmitter. The identifier detection unit is configured to detect the optical state of at least one identification element of an identifier of a geodetic target on the basis of, for example, the wavelength or polarization of the radiation received in the measurement instrument. The radiation is emitted or absorbed or reflected by the at least one identification element of the geodetic target, as described above. The measuring unit is configured to perform a measurement with respect to a measuring target of the geodetic target, in particular a distance measurement, and, for this purpose, to emit, for example, a measuring radiation towards the geodetic target, or to cause the geodetic target to emit a measuring radiation. The transmitter is configured to address a receiver of the geodetic target and to supply control commands to the same, for example, via an air interface, the control commands causing the change of the optical state of the at least one identification element of the identifier of the geodetic target. The air interface may be, for example, be radio based (transmission via electromagnetic waves), infrared based or sonic based, the present invention being, however, not limited thereto. Furthermore, the geodetic measurement instrument may be configured to confirm the identity of the geodetic target if the optical state of the at least one identification element of the identifier of the geodetic target changes as a result of the transmission of the control command.

Furthermore, according to embodiments, a system is provided which comprises, besides the geodetic target described hereinbefore, the geodetic measurement instrument described hereinbefore.

In this case, the geodetic measurement instrument is configured to confirm the identity of the geodetic target if the optical state of the at least one identification element of the identifier of the geodetic target changes as a result of the transmission of the control command.

Alternatively, or in addition, the geodetic measurement instrument is configured to adjust the size of a representation of the identifier of the geodetic target in the geodetic measurement instrument to a field of view of the measuring unit of the geodetic measurement instrument by transmission of the control command. This may be particular helpful, if the arrangement of the identification elements in the geodetic target allows to define differently sized geometric figures by selectively activating individual identification elements. This allows, by appropriately controlling the identification elements, to effect a change to the size of a representation of the geodetic target in the geodetic measurement instrument, and thus to effect a change to the size of the identifier, from the viewpoint of the geodetic measurement instrument at a same distance between geodetic measurement instrument and geodetic target.

According to a further embodiment of the system, at least two geodetic targets are provided, and the identifier detection unit of the geodetic measurement instrument is further configured to identify the geodetic targets by using the respective identifiers and to selectively perform the measurements successively with respect to the measuring targets of the targets.

Embodiments of a measurement method for determining the spatial position and/or orientation of a geodetic target, which method may in particular be performed with the geodetic target described above and the geodetic measurement instrument described above in the above-described system, comprise:

detecting the optical state of at least one identification element of an identifier of the geodetic target on the basis of radiation received by the geodetic measurement instrument;

transmitting a control command to the geodetic target by using the geodetic measurement instrument, the control command causing a change of the optical state of the at least one identification element of the identifier of the geodetic target; and detecting the optical state of the at least one identification element of the identifier of the geodetic target on the basis of radiation received by the geodetic measurement instrument. If a change corresponding to the control command is made to the identifier of the geodetic target, the geodetic target can be identified unambiguously. Furthermore, it is thus possible to adjust the identifier of the geodetic target to difficult measurement conditions, in particular, difficult visibility conditions, for example.

Alternatively or in addition, detecting the optical state of the at least one identification element of the identifier of the geodetic target can also be performed on the basis of radiation received by the geodetic measurement instrument, in order to determine the identity of the geodetic target after the size of the representation of the identifier of the geodetic target has been adapted to a field of view of the geodetic measurement device on account of a change of the optical state of the at least one identification element as a result of the transmission of the control command.

According to embodiments, the method further comprises emitting a measuring radiation to the geodetic target by the geodetic instrument in order to perform a measurement with respect to the measuring target. Alternatively, the geodetic target may also be instructed by the measurement instrument to emit a measuring radiation.

According to embodiments, detecting the optical state of the at least one identification element of the identifier of the geodetic target comprises generating a two-dimensional image and detecting the at least one identification element in the two-dimensional image by using electronic image processing.

According to embodiments, the method further comprises manually or automatically aligning the geodetic instrument to the geodetic target or geodetic targets. This is performed, in particular, after the respective geodetic target has been identified on the basis of its identifier.

According to embodiments, the method further comprises determining an orientation of the geodetic target and correcting a measurement result on the basis of the determined orientation of the geodetic target. The orientation can be determined, for example, on the basis of a comparison of the spatial position of at least two identification elements of the identifier of the geodetic target detected in a two-dimensional image produced by the geodetic measurement instrument by using electronic image processing, with the known factual predefined special position of the at least two identification elements of the identifier.

The above-described embodiments and the aspects specified therein do not need to be considered separately, but can be combined with one another.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF THE INVENTION

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

In the following, three exemplary embodiments of a geodetic target 1, 1', 1" for use in geodesy are described with reference to FIGS. 1A to 1C.

In the depicted embodiments, the geodetic target 1, 1', 1" comprises a support that supports a measuring target and an identifier 4, 4', 4". In the depicted embodiments, the support is a rod 2 and the measuring target is a retroreflector 3. Each identifier 4, 4' and 4" comprises a plurality of identification elements 41-44. Each one of the identification elements 41-44 may exhibit different predetermined optical properties and thus may adopt different optical states.

A microprocessor 5 is provided for controlling the optical states of the identification elements 41-44. In the embodiments shown in FIGS. 1A and 1B the microprocessor 5 is accommodated in the rod 2, forming the support, and electrically connected to the identification elements 41 to 44.

Figures 1A, 1B:
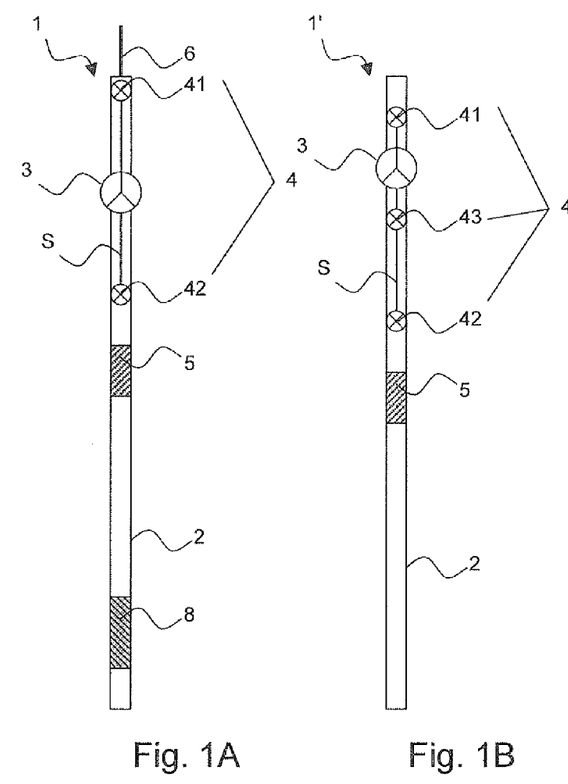
FIGS. 1A to 1C show schematic front views of geodetic targets according to different embodiments.

In the geodetic target 1 of FIG. 1A, the identification elements are formed by organic light-emitting diodes 41 and 42, each of which may adopt the predetermined optical properties and thus the different optical states "OFF", "EMISSION OF RED LIGHT", "EMISSION OF GREEN LIGHT" and "EMISSION OF WHITE LIGHT". For this purpose, an energy source, in the form of a battery 8, is accommodated in the support 2, which energy source is connected to the organic light-emitting diodes 41 and 42 via the microprocessor 5. Furthermore, the geodetic target 1 comprises an addressable receiver 6 that is connected to the microprocessor 5 and receives control commands for the microprocessor 5 via an air interface. In the present case, the receiver 6 is addressed digitally, but it can also be addressed via the frequency used, for example. The present invention is, of course, not limited to the use of organic light-emitting diodes as identification elements or to four optical states of the identification elements. For example, other spotlight sources having preferably low energy consumption, such as, for example, customary light-emitting diodes may be used. The retroreflector 3 is arranged in the center of a straight line S connecting the organic light-emitting diodes 41 and 42 such that the position of the retroreflector 3 can be determined with ease once the positions of the organic light-emitting diodes 41 and 42 are known.

In contrast to the embodiment according to FIG. 1A, indicators 41, 42 and 43 operating according to the electrophoresis principle are used as identification elements in the geodetic target 1' of the embodiment according to FIG. 1B. Such types of indicators exhibit two predetermined optical properties and thus optical states in which radiation of a specific wavelength is reflected or absorbed to a higher or lesser degree. As indicators operating according to the principle of electrophoresis require no energy to maintain an optical state, the geodetic target 1' of this embodiment does not need to have an energy source of its own. However, the controller that is provided in the form of a relay array 5 in this embodiment comprises a connector (not shown), which enables energy to be supplied in order to change the optical state of the indicators 41, 42 and 43. The present invention is, of course, not limited to the use of indicators or reflectors operating according to the principle of electrophoresis as identification elements or to two different optical states of the identification elements. For example, other components can be used which require no energy supply to maintain an optical state, such as, for example, bistable LCDs, indicators or reflectors operating according to the principle of micromechanically controlled interference modulation or indicators or reflectors operating according to the principle of electrowetting. In this embodiment, the retroreflector 3 is arranged along a straight line S connecting indicators 41-43, too.

Figure 1C:
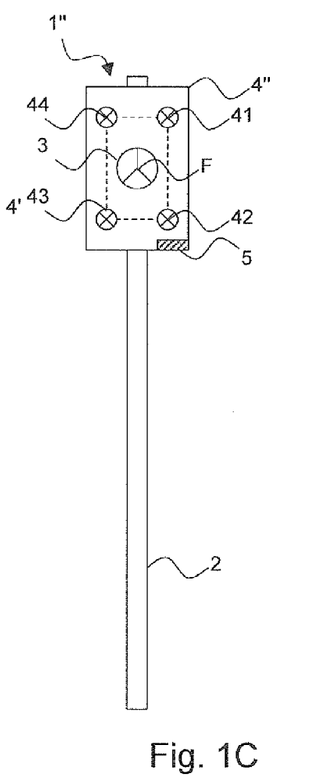

The embodiment shown in FIG. 1C differs from the embodiment shown in FIG. 1B, in particular in that the identification elements 41-44 of the identifier 4" are not directly supported by the rod 2, but are mounted on a separate plate. This may be advantageous if, due to a large distance to a geodetic measurement instrument or due to bad observation conditions, the identifier needs to be particularly large. Moreover, the identification elements 41-44 of the geodetic target 1" are not formed by indicators operating according to the principle of electrophoresis, but by indicators operating according to the principle of electrowetting. Here, no energy supply is necessary for the identification elements 41-44 to maintain an optical state, too. The present invention is, of course, not limited to the use of indicators or reflectors operating according to the principle of electrowetting as identification elements. For example, other components which require no energy supply to maintain an optical state may be used, such as bistable LCDs, indicators or reflectors operating according to the principle of micromechanically controlled interface modulation or indicators or reflectors operating according to the principle of electrophoresis. In geodetic target 1" the measuring target 3 is arranged in the centroid F of a regular area, the corner points of which are defined by the identification elements 41-44. This allows determining the position of the measuring target 3 with particular ease and high accuracy once the positions of the identification elements 41-44 have been detected. Finally, in the embodiment of FIG. 1C the microprocessor 5 is not supported by rod 2, but by the plate of the identifier 4".

The present invention is, however, not limited to geodetic targets 1, 1', 1" according to the embodiments of FIGS. 1A to 1C. For example, a plate or another solid body such as, for example, a ball or the like may serve as support, instead of a rod. Similarly, the measurement object itself, such as a vehicle or a building or a landmark for example, may serve as support. Moreover, an active measuring target emitting radiation may, for example, serve as measuring target instead of a retroreflector. Instead of a battery, another energy source, preferably mobile energy source, such as an accumulator or a solar cell may be used, for example. Furthermore, the embodiments of FIGS. 1A to 1C may be combined with each other as desired. For example, just as in the embodiment of FIG. 1A, the embodiment of FIGS. 1B and 1C, may selectively comprise an addressable receiver and an energy supply of its own. Moreover, in addition to the identifiers 4, 4', 4", further identifiers may be provided on the support in the form of color markings or geometric figures.

Figure 2A:
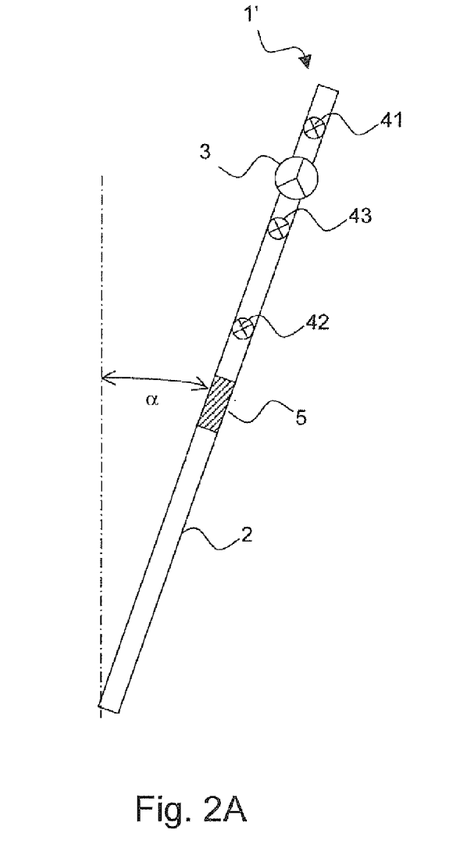
FIGS. 2A and 2B show schematic views of geodetic targets shown in FIGS. 1B and 1C at different orientations.
Figure 2B:
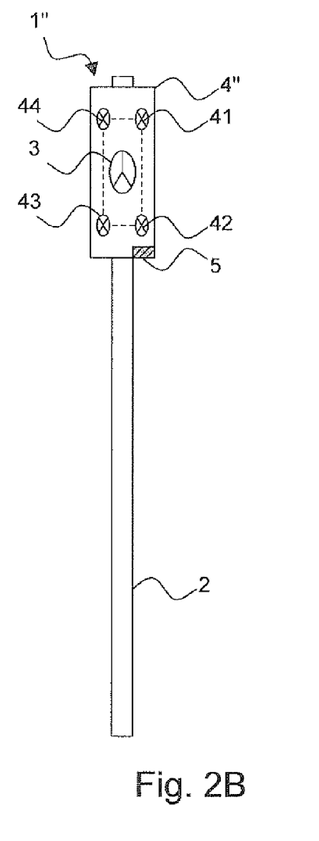

FIGS. 2A and 2B are schematic views of geodetic targets 1', 1" of FIGS. 1B and 1C with different orientations of the geodetic targets 1', 1".

In FIG. 2A, the geodetic target 1' known from FIG. 1B is inclined at an angle α to the vertical. This may be required if, due to the space conditions, geodetic target 1' cannot be positioned vertically at a measurement point. The angle α can be determined with ease by a geodetic measurement instrument, because the orientation of the geodetic target 1' is easily detectable on the basis of the straight connecting line S between the light-emitting diodes 41-43, since the arrangement of the light-emitting diodes 41-43 on the rod 2 is known. This enables a correction of a geodetic measurement performed with the inclined geodetic target V.

FIG. 2B shows an orientation of geodetic target 1" known from FIG. 1C in which the geodetic target 1" is vertically oriented, but rotated through an angle β relative to a measurement direction of a geodetic measurement instrument. Angle β is shown in top view in FIG. 5B. As a result, the relative spatial position of the identification elements 41-44 of the identifier 4" on the plate is distorted. A geodetic measurement instrument can recognize this distortion. As the actual spatial position of the identification elements 41-44 is known, the angle β of rotation of the geodetic target 1" relative to the measuring direction of the geodetic measurement instrument 7 can be determined automatically by the geodetic measurement instrument 7. This allows correcting the alignment of the geodetic target 1 with the measurement instrument 7.

FIGS. 3A-3D show, by way of example, front views of identifiers **4\*-4\*\*\*\* which can be used as an alternative to the identifiers 4, 4', 4" in geodetic targets 1, 1', 1" shown in FIGS. 1A-1C**.

Figure 3A:
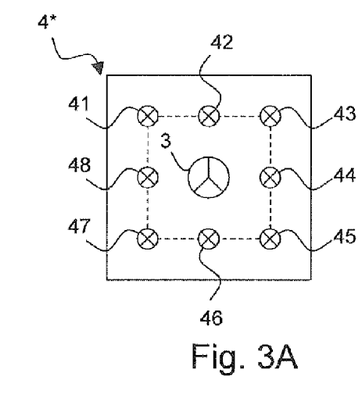
FIGS. 3A to 3D show schematic front views of identifiers which may be alternatively used in the geodetic targets shown in FIGS. 1A-1C.

The identification elements 41-48 of identifier 4\* shown in FIG. 3A are positioned in the corners and the centers of the sides of a square, and the measuring target 3 is positioned in the centroid of the square.

Figure 3B:
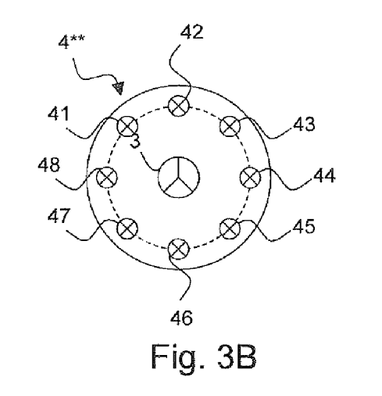

The identification elements 41-48 of the identifier **4\*\* shown in FIG. 3B are positioned along a circle, and the measuring target 3** is positioned in the center (and thus centroid) of the circle.

Figure 3C:
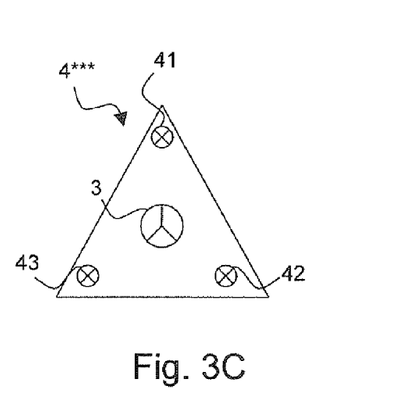

The identification elements 41-48 of identifier **4\*\*\* shown in FIG. 3C are positioned in the corners of a triangle, and the measuring target 3** is positioned in the centroid of the triangle.

Figure 3D:
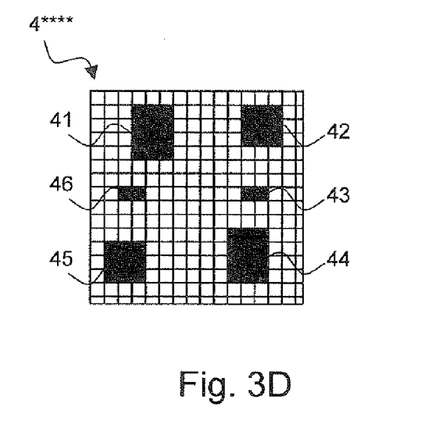

In the embodiment shown in FIG. 3D, the identification elements 41-46 of the identifier **4\*\*\*\* are formed by a different number of pixels of a pixel matrix, such as, for example, of a monitor screen, a matrix display or an electronic paper, wherein each pixel may exhibit two or more than two predetermined optical properties and thus states (such as, for example, different colors, different intensities, different polarizations etc.). In FIG. 3D, the identification elements 41 and 44, 42 and 45, 43 and 46 are in pairs formed by pixels of equal number and arrangement. However, this is not compulsory. Moreover, in the embodiment of FIG. 3D, the measuring target is positioned outside of the identifier 4\*\*\*\* and thus not shown. Apparently, the fact that the measuring target is positioned outside of the identifier 4\*\*\*\* does not exclude that the spatial position of the measuring target relative to the identification elements 41-46** is pre-known.

Suitable for use as identification element 41-48 of the identifier **4\*-4\*\*\*\* of FIGS. 3A-3D is any element which has at least a first optical state in which radiation of a first wavelength or first polarization is emitted or a first wavelength or first polarization of received radiation is absorbed and which has at least a further state in which radiation of the first wavelength or first polarization is not emitted or absorbed, respectively. It is, of course, possible to depart from the number of identification elements 41-48 shown in FIGS. 3A-3D. Moreover, the arrangement of identification elements 41-48** can be arbitrarily combined (for example circle with triangle or square, pixel matrix with circle etc.).

FIGS. 4A-4F show, by way of example, how an identifier 4\* may have different identities due to different optical states adopted by individual identification elements 41-48 of the identifier 4*. This renders different geodetic targets to be distinguishable from one another or allows one and the same geodetic target to sequentially have different identities at different times.

In FIGS. 4A-4F, black punctiform identification elements 41-48 represent identification elements 41-48 in a first optical state, and identification elements that are depicted as white circle with a cross represent identification elements 41-48 in an optical state that differs from the first optical state. The identification elements thus have different optical properties in the different optical states.

Figure 4A:
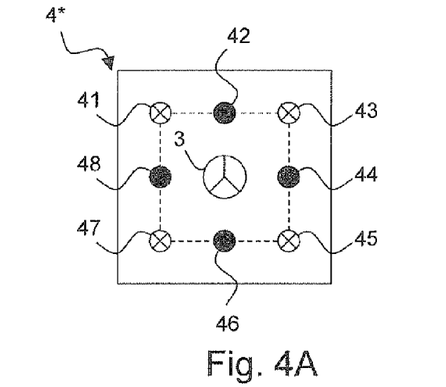
FIGS. 4A to 4F show schematically examples of different optical states of the identifier shown in FIG. 3A.
Figure 4B:
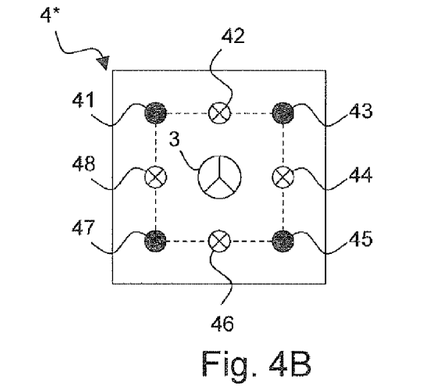
Figure 4C:
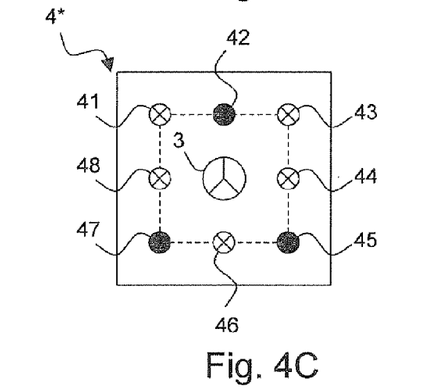
Figure 4D:
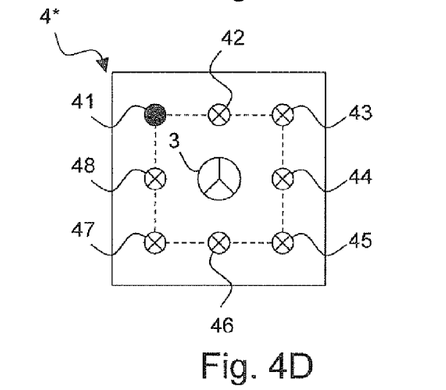
Figure 4E:
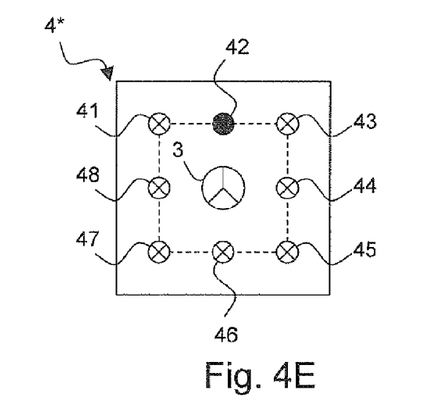
Figure 4F:
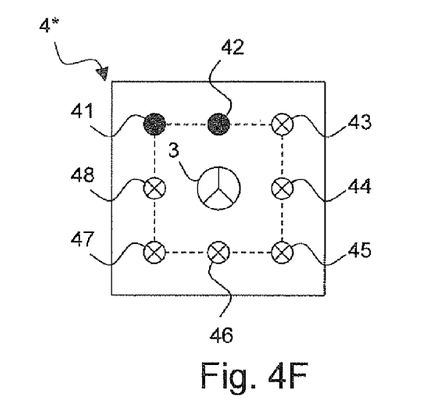

As shown in FIGS. 4A-4C, the optical states of the identification elements can be controlled, for example, such that the identification elements 41-48 of the identifier 4* define different geometric figures, in the centroid of which the measuring target 3 is positioned. However, this is not compulsory. For example, in order to identify a geodetic target it also suffices to control the identification elements of the identifier 4* such that they have a coding, for example, a binary coding, as shown in FIGS. 4D-4F. In the binary coding example, the identifier 4* of FIG. 4D represents the geodetic target "No. 1", the identifier 4* of FIG. 4E represents the geodetic target "No. 2" and the identifier 4* of FIG. 4F represents the geodetic target "No. 3".

Figure 5A:
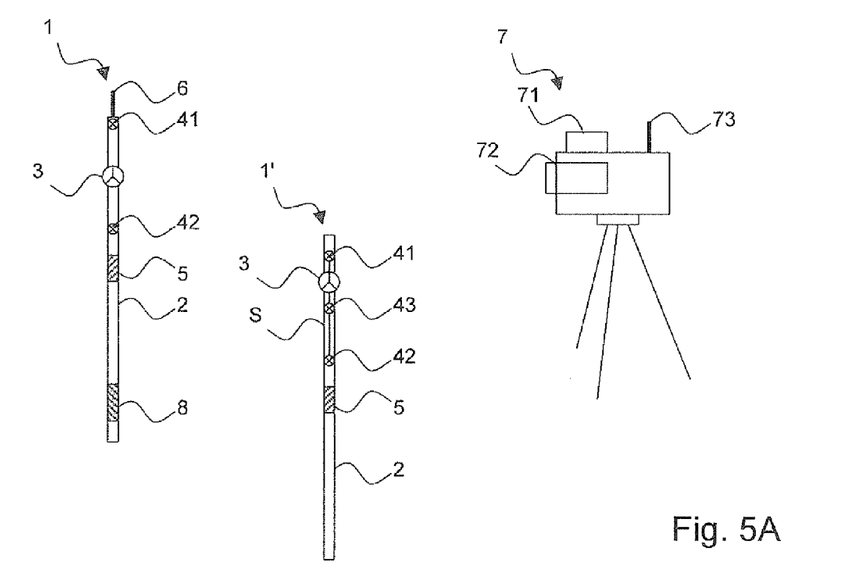
FIGS. 5A and 5B show schematic side views and a top view of a system consisting of the geodetic target shown in FIG. 1A respectively 1C and a geodetic measurement instrument.
Figure 5B:
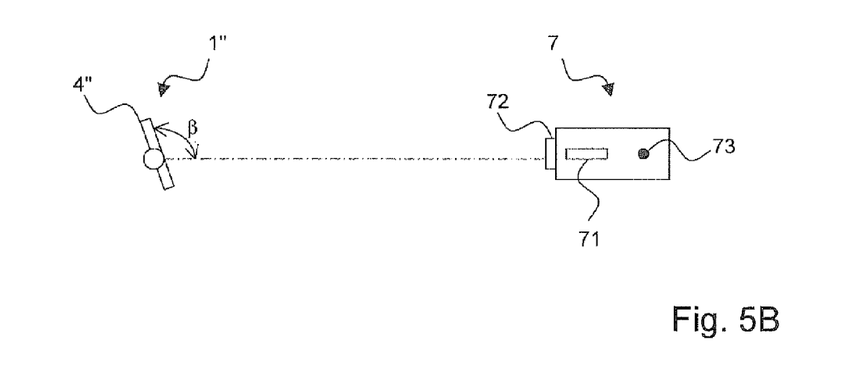

FIGS. 5A and 5B respectively show a side view and top view, of a system formed of a geodetic measurement instrument 7 and geodetic targets 1, 1', 1" having the structure described above.

In the embodiment shown in FIG. 5A, the geodetic measurement instrument 7 comprises an identifier detection unit which is formed by a two-dimensional CCD sensor 71 and configured to detect the optical state and the spatial position of at least one identification element 41-42 of the identifier 4 of the geodetic target 1 and at least one identification element 41-43 of the identifier 4' of the geodetic target 1' by using the wavelength of the radiation received by the geodetic measurement instrument 7. Furthermore, the geodetic measurement instrument 7 comprises a measuring unit, formed by a tachymeter 72, to perform a measurement in relation to the measuring target 3 of the geodetic target 1 and the geodetic target 1' and to emit radiation for this purpose. Finally, the geodetic measurement instrument 7 comprises a transmitter 73, formed by an oscillator with subsequent amplifier and a transmitting antenna, for providing an air interface to selectively supply control commands to the controller 5 of the geodetic targets 1 via the respective addressable receiver 6 of the geodetic target 1 by transmitting corresponding electromagnetic waves, the control commands causing a change of the optical state of the identification elements 41-42 of the geodetic target 1. By transmitting such a control command and detecting the change effected to the identifier of the geodetic target 1 it is possible to confirm the identity of the geodetic target 1 in relation to the geodetic measurement instrument 7. Although the system shown in the depicted embodiment makes use of the geodetic targets 1, 1' known from FIG. 1A, 1B, the present invention is not limited to such a use. Alternatively, any other geodetic target may be used which falls within the scope of protection of the claims. Although the air interface is radio based in the depicted embodiment, the invention is not limited thereto. Alternatively, light, infrared or ultrasound may be used to transmit the control commands. Equally, other geodetic measurement instruments, such as, for example, a theodolite, a level, a laser scanner or a distance meter may be used as measuring unit. As identifier detection unit, for example, a spectrometer can be used as an alternative. Furthermore, it is stressed that the geodetic measurement instrument 7 is described only in very general terms. The geodetic instrument 7 may comprise further components such as microprocessors, energy sources or interfaces, for example.

FIG. 5B differs from FIG. 5A by showing the geodetic target 1" known from FIG. 1C instead of the geodetic targets 1, 1' known from FIGS. 1A, 1B. Geodetic target 1" known from FIG. 1C is rotated by an angle β relative to a measurement direction of the geodetic measurement instrument 7, as it is also shown in FIG. 2B. This angle β can be determined by the geodetic measurement instrument 7 based on a comparison of the distortion of the relative arrangement of the identification elements 41-46 of the identifier 4" detected by as the two-dimensional CCD sensor 71 with the known factual relative arrangement of the identification elements of the identifier 4".

Figure 6:
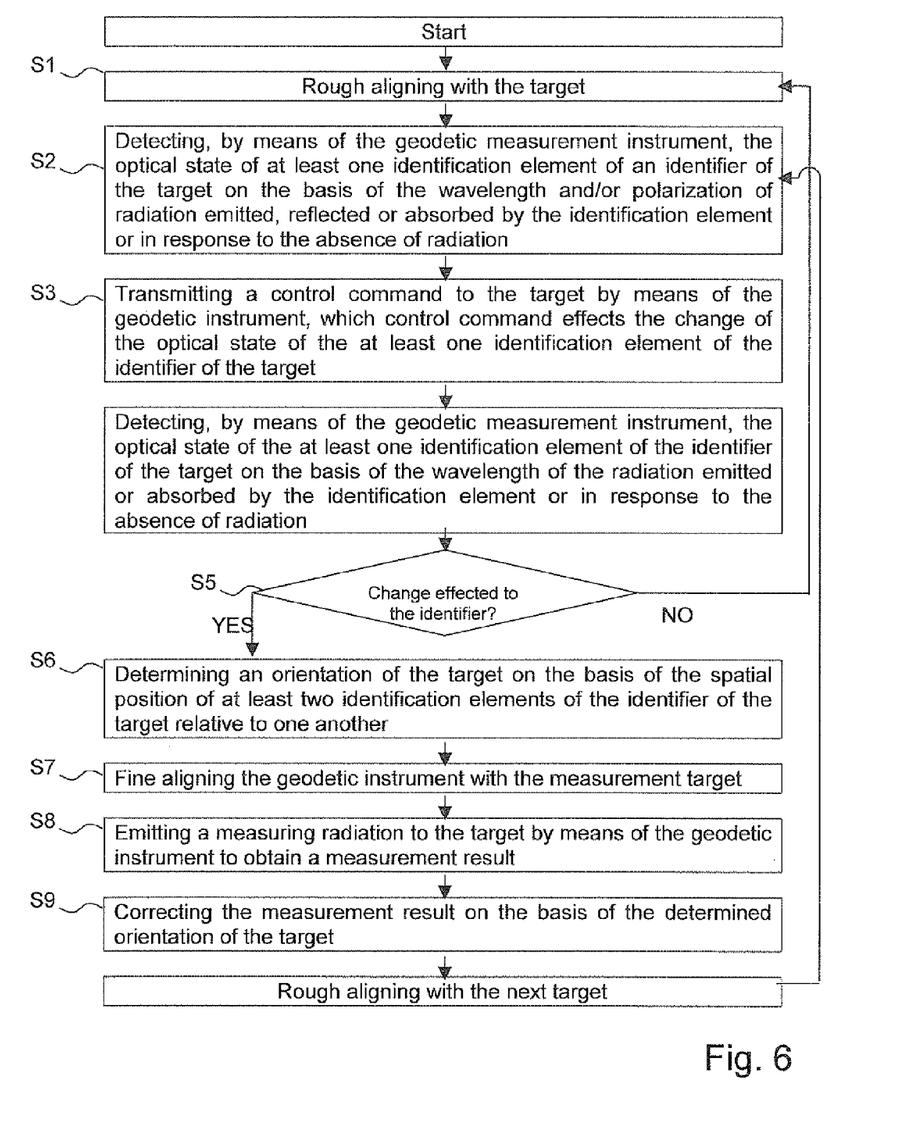
FIG. 6 is a flow chart of a measurement method for determining the spatial position and/or orientation of a geodetic target.

FIG. 6 shows an embodiment of a measurement method for determining the spatial position and orientation of a geodetic target relative to a geodetic measurement instrument.

In a first step S1, an identifier detection unit of the geodetic measurement instrument is roughly aligned with the geodetic target. This may be performed automatically by the geodetic measurement instrument or manually by a user.

In subsequent step S2, the identifier detection unit of the geodetic measurement instrument detects the optical state of at least one identification element of the identifier of the geodetic target on the basis of a wavelength and/or polarization of radiation emitted, reflected or absorbed by the identification element. In case of absence of radiation, for example, it is possible to determine that the corresponding identification element is not active/OFF. In the depicted embodiment, this step is performed by a spectral analysis of the radiation received by the identifier detection unit.

In subsequent step S3, the geodetic measurement instrument broadcasts a control command to the controller of the geodetic target via an air interface, which control command causes the controller to change the optical state of at least one identification element of the identifier of the geodetic target.

In subsequent step S4, the optical state of the at least one identification element of the identifier of the geodetic target is detected again by using the wavelength or polarization of the radiation received by the geodetic measurement instrument. As a result, it can be determined whether the identification element is ON or OFF, or which color or polarization the identification element has, for example. Unlike step S2, this is effected in step S4 of this embodiment by generating a two-dimensional image of the geodetic target and by detecting the identification elements in the two-dimensional image of the geodetic target by electronic image processing. This allows not only to determine the optical state of the at least one identification element but also to determine the spatial position of the identification elements relative to each other.

If it is determined in subsequent step S5 that the identifier of the geodetic target has changed in the way that was to be expected as a result of the control command sent to the geodetic target, it is confirmed that the geodetic target has been identified correctly. The orientation of the geodetic target is determined in subsequent step S6 on the basis of the spatial position of at least two identification elements of the identifier of the geodetic target relative to one another. For this purpose, the two-dimensional image of the geodetic target produced in step S4 is used. If, in response to the control command, the size of a representation of the identifier in the geodetic measurement instruments was adjusted to a field of view of the geodetic measurement instrument, step S5 additionally comprises an identification of the geodetic target on the basis of its identifier.

Subsequently, the geodetic instrument is automatically aligned with the measuring target in step S7 on the basis of the pre-known spatial position of the measuring target relative to the spatial position of the at least one identification element, determined in step S4.

In step S8, the geodetic instrument performs a measurement with respect to the geodetic target in that the geodetic instrument emits measuring radiation towards the geodetic target to obtain a measurement result with respect to the geodetic target.

The thus obtained measurement result is corrected in step S9, taking into consideration the orientation of the geodetic target determined in step S6, before the procedure is terminated or continued with a rough alignment with the next geodetic target.

However, if it is determined in step S5 that a change, as was to be expected on account of the control command, has not been made to the identifier of the geodetic target, it is clear that the identifier of the desired geodetic target was not detected correctly in steps S2 and S4. Accordingly, the procedure returns to step S1 in which a rough alignment of the geodetic measurement instrument with the geodetic target is performed.

It is emphasized that, steps S6 to S8 are only optional.

FIGS. 7A-7D show exemplary front views of identifiers 4# and 4~ which may be used as an alternative to the identifiers 4, 4', 4" in the geodetic targets 1, 1', 1" shown in FIGS. 1A-1C.

Figure 7A:
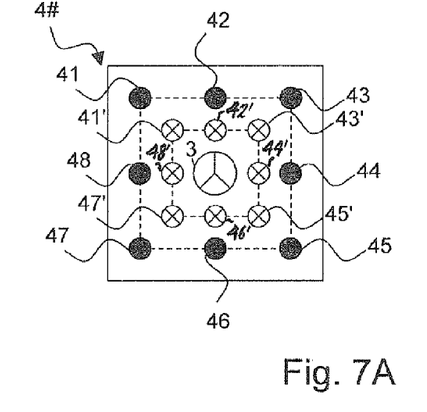
FIGS. 7A to 7D show schematic front views of identifiers which may be alternatively used in the geodetic targets shown in FIGS. 1A-1C, wherein FIGS. 7A and 7B and 7C and 7D, respectively, show the same identifier in pairs in different optical states.
Figure 7B:
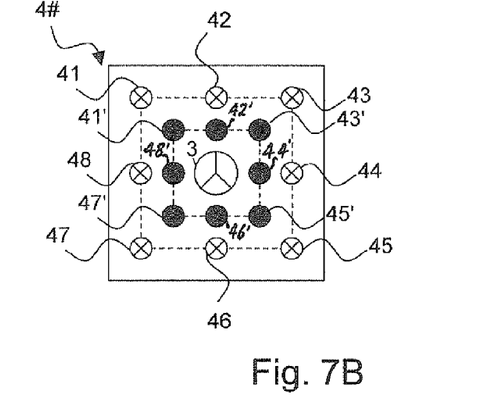

The identification elements 41-48 and 41'-48' of the identifier 4# shown in FIGS. 7A and 7B are positioned in the corners and the centers of the sides of two differently sized squares, the smaller square being positioned within the larger square. The centroids of both squares coincide. The measuring target 3 is arranged in the centroid of the squares. As identification elements, for example, those identification elements can be used which are mentioned in the description of FIGS. 3A-3D.

FIGS. 7A and 7B each show, by way of example, how the identifier 4# may have different sizes, from the viewpoint of the geodetic measurement instrument. The different sizes of the identifier 4# are achieved by different optical states of the identification elements 41-48 and 41'-48', respectively, of the identifier 4#. If the outer identification elements 41-48 have a first optical state and the inner identification 41'-48' have an optical state which is different from the first optical state, as shown in FIG. 7A, the identifier 4# of the geodetic target is large from the viewpoint of a geodetic measurement instrument. However, if the inner identification elements 41'-48' have the first optical state and the outer identification elements 41-48 have the optical state which is different from the first optical state, as shown in FIG. 7B, the identifier 4# of the geodetic target is comparatively small from the viewpoint of a geodetic measurement instrument located at constant distance from the identifier 4#.

Figure 7C:
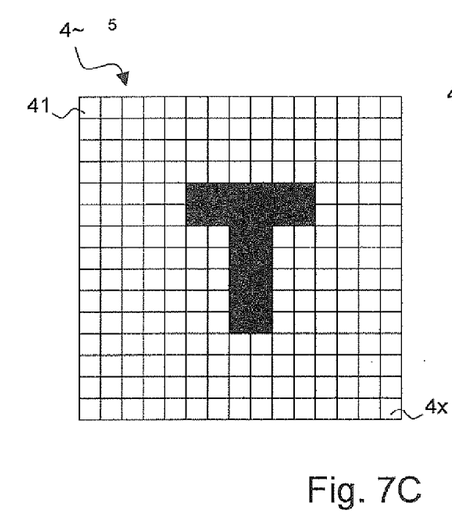
Figure 7D:
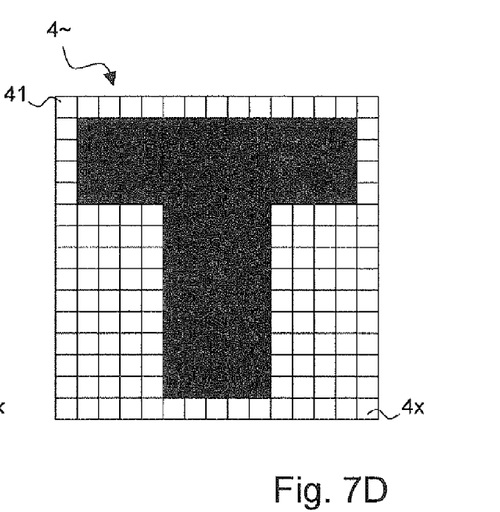

The structure of identifier 4~ of FIGS. 7C and 7D is similar to the structure of the identifier 4**** of FIG. 3D. Accordingly, the identification elements 41-4x are formed by a number of pixels of a pixel matrix. Reference is made to the description of FIG. 3D.

In FIG. 7C the pixels having a first optical state are forming a smaller figure than in FIG. 7D. Accordingly, the identifier 4~ of FIG. 7C appears, from the viewpoint of a geodetic instrument having the same distance, to be smaller than the identifier 4~ of FIG. 7D.

Accordingly, it is possible, by appropriately controlling the identification elements, to change the size of a representation of the geodetic target in a geodetic measurement instrument and thus the size of the identifier from the viewpoint of the geodetic measurement instrument located at a constant distance from the geodetic target. This is advantageous if the same kind of geodetic target is used for measurements where the distance between the geodetic measurement instrument and the geodetic target can be either comparatively small or comparatively large. If the distance is small and the identifier is too large, there would be the danger that the geodetic measurement instrument is not capable of detecting the entire identifier, because the identifier is larger than a field of view of the geodetic measurement instrument at this distance. If the distance is large and the identifier too small, however, there is the danger that the geodetic measurement instrument is unable to resolve the individual identification elements and thus to correctly identify the geodetic target. The geodetic measurement instrument can initiate the above-described change of size of a representation of the geodetic target, by emitting of a corresponding control command to the geodetic target, for example.

It is emphasized that the change of size of the identifier of the geodetic target from the viewpoint of a geodetic measurement instrument described above is only optional.

It should be noted in this context that the terms "comprise", "include", "having" and "with", as well as grammatical modifications thereof used in this specification or in the claims, indicate the presence of technical features such as stated components, figures, integers, steps or the like, and by no means preclude the presence or addition of one or more alternative features, particularly other components, figures, integers, steps or groups thereof.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A geodetic target for use in geodesy, comprising:
a support;
a measuring target supported by the support, the measuring target including a reflector or a radiation source for emitting measuring radiation that is used for performing a measurement with respect to the measuring target;
an identifier supported by the support that is separate from the measuring target, the identifier including at least one identification element which is configured to be switchable between at least two optical states, wherein the identification element has a first predetermined optical property in one optical state and does not have the first predetermined optical property in a further optical state; and
a controller configured to change the optical state of the at least one identification element.

2. The geodetic target according to claim 1 wherein the at least one identification element is an indicator or reflector operating according to the principle of electrophoresis, electrowetting or micromechanically controlled interference modulation.

3. The geodetic target according to claim 2 wherein the at least one identification element is formed of a spatially delimited, discrete element which emits radiation.

4. The geodetic target according to claim 2 wherein the at least one identification element is formed of one or more pixels of a pixel matrix.

5. The geodetic target according to claim 1 wherein the at least one identification element is a bistable LCD or a light-emitting diode or an organic light-emitting diode.

6. The geodetic target according to claim 5 wherein the at least one identification element is formed of one or more pixels of a pixel matrix.

7. The geodetic target according to claim 1 wherein the at least one identification element is formed of a spatially delimited, discrete element which emits radiation.

8. The geodetic target according to claim 7 comprising at least two, or at least three or at least eight identification elements disposed spaced from one another.

9. The geodetic target according to claim 8 wherein the measuring target is disposed along a straight line connecting two identification elements.

10. The geodetic target according to claim 8 wherein the measuring target is disposed in the centroid of a regular area (F), the corner points of which are defined by the identification elements.

11. The geodetic target according to claim 8 wherein the identification elements are disposed such that they form at least two geometric figures of different size.

12. The geodetic target according to claim 8 wherein the identification elements are disposed regularly, and the controller is configured to change the optical state of plural identification elements at the same time, such that the identification elements having the same optical state selectively form geometric figures which differ from one another with respect to at least one of the shape or the size.

13. The geodetic target according to claim 7 further comprising an addressable receiver that is configured to receive control commands and to supply the same to the controller, the control commands causing the change of the optical state of at least one identification element of the identifier.

14. The geodetic target according to claim 1 wherein the at least one identification element is formed of one or more pixels of a pixel matrix.

15. The geodetic target according to claim 14 further comprising an addressable receiver that is configured to receive control commands and to supply the same to the controller, the control commands causing the change of the optical state of at least one identification element of the identifier.

16. The geodetic target according to claim 1 comprising at least two, or at least three or at least eight identification elements disposed spaced from one another.

17. The geodetic target according to claim 16 wherein the measuring target is disposed along a straight line connecting two identification elements.

18. The geodetic target according to claim 16 wherein the measuring target is disposed in the centroid of a regular area (F), the corner points of which are defined by the identification elements.

19. The geodetic target according to claim 16 wherein the identification elements are disposed such that they form at least two geometric figures of different size.

20. The geodetic target according to claim 16 wherein the identification elements are disposed regularly, and the controller is configured to change the optical state of plural identification elements at the same time, such that the identification elements having the same optical state selectively form geometric figures which differ from one another with respect to at least one of the shape or the size.

21. The geodetic target according to claim 1 further comprising an addressable receiver that is configured to receive control commands and to supply the same to the controller, the control commands causing the change of the optical state of at least one identification element of the identifier.

22. A geodetic measurement instrument, comprising:
an identifier detection unit configured to detect the optical state of at least one identification element of an identifier of a geodetic target on the basis of radiation received at the measurement instrument;
a measuring unit which is configured to perform a measurement with respect to a measuring target of the geodetic target; and
a transmitter which is configured to address a receiver of the geodetic target and to transmit thereto control commands which cause a change of the optical state of the at least one identification element of the identifier of the geodetic target.

23. The geodetic measurement instrument according to claim 22 wherein the measuring unit is configured to emit a measuring radiation to the geodetic target for performing a measurement with respect to the measuring target of the geodetic target.

24. A system, comprising a geodetic target for use in geodesy and a geodetic measurement instrument,
the geodetic target comprising:
a support;
a measuring target supported by the support;
an identifier supported by the support, the identifier including at least one identification element which is configured to be switchable between at least two optical states, wherein the identification element has a first predetermined optical property in one optical state and does not have the first predetermined optical property in a further optical state;
a controller configured to change the optical state of the at least one identification element; and
an addressable receiver that is configured to receive control commands and to supply the same to the controller, the control commands causing the change of the optical state of at least one identification element of the identifier;
the geodetic measurement instrument comprising:
an identifier detection unit configured to detect the optical state of at least one identification element of an identifier of a geodetic target on the basis of radiation received at the measurement instrument;
a measuring unit which is configured to perform a measurement with respect to a measuring target of the geodetic target; and
a transmitter which is configured to address a receiver of the geodetic target and to transmit thereto control commands which cause a change of the optical state of the at least one identification element of the identifier of the geodetic target;
wherein the geodetic measurement instrument is configured to confirm the identity of the geodetic target if the optical state of the at least one identification element of the identifier of the geodetic target changes as a result of the transmission of the control command.

25. The system according to claim 24 comprising at least two geodetic targets, wherein the identifier detection unit of the geodetic measurement instrument is configured to identify the at least two geodetic targets on the basis of their respective identifiers and to selectively perform successive measurements with respect to the measuring targets of the geodetic targets.

26. A system, comprising a geodetic target for use in geodesy and a geodetic measurement instrument,
the geodetic target comprising:
a support;
a measuring target supported by the support;

an identifier supported by the support, the identifier including at least one identification element which is configured to be switchable between at least two optical states, wherein the identification element has a first predetermined optical property in one optical state and does not have the first predetermined optical property in a further optical state;

a controller configured to change the optical state of the at least one identification element; and an addressable receiver that is configured to receive control commands and to supply the same to the controller, the control commands causing the change of the optical state of at least one identification element of the identifier;

the geodetic measurement instrument comprising:

an identifier detection unit configured to detect the optical state of at least one identification element of an identifier of a geodetic target on the basis of radiation received at the measurement instrument;

a measuring unit which is configured to perform a measurement with respect to a measuring target of the geodetic target; and a transmitter which is configured to address a receiver of the geodetic target and to transmit thereto control commands which cause a change of the optical state of the at least one identification element of the identifier of the geodetic target;

wherein the geodetic measurement instrument is configured to adjust the size of a representation of the identifier of the geodetic target in the geodetic measurement instrument, by transmission of the control command, to a field of view of the measuring unit of the geodetic measurement instrument.

27. A measurement method for determining an orientation of a geodetic target relative to a geodetic measurement instrument, comprising:

detecting the optical state of at least two identification elements of an identifier of the geodetic target on the basis of radiation received at the geodetic measurement instrument;

transmitting a control command to the geodetic target by using the geodetic measurement instrument, the control command effecting the change of the optical state of at least one of the at least two identification elements of the identifier of the geodetic target;

detecting the optical state of the at least two identification elements of the identifier of the geodetic target on the basis of radiation received at the geodetic measurement instrument in order to confirm the identity of the geodetic target if the optical state of at least one of the at least two identification elements of the identifier of the geodetic target changes as a result of the transmission of the control command; and determining the orientation of the geodetic target on the basis of a spatial position of at least two identification elements of the identifier of the geodetic target relative to one another.

28. The measurement method according to claim 27, further comprising:

emitting a measuring radiation to the geodetic target by using the geodetic instrument in order to perform a measurement with respect to the measuring target.

29. The measurement method according to claim 28, further comprising:

correcting the measurement on the basis of the determined orientation of the geodetic target.

30. The measurement method according to claim 27, wherein detecting the optical state of the at least one identification element of the identifier of the geodetic target comprises producing of a two-dimensional image and detecting the at least one identification element in the two-dimensional image by using electronic image processing.

31. A measurement method for determining at least one of the spatial position and orientation of a geodetic target relative to a geodetic measurement instrument, comprising:

detecting the optical state of at least one identification element of an identifier of the geodetic target on the basis of radiation received at the geodetic measurement instrument;

transmitting a control command to the geodetic target by using the geodetic measurement instrument, the control command effecting the change of the optical state of the at least one identification element of the identifier of the geodetic target; and detecting the optical state of the at least one identification element of the identifier of the geodetic target on the basis of radiation received at the geodetic measurement instrument in order to determine the identity of the geodetic target after the size of the representation of the identifier of the geodetic target has been adapted to the field of view of the geodetic measurement instrument as a result of a change of the optical state of the at least one identification element due to the transmission of the control command.

32. The measurement method according to claim 31 further comprising:

emitting a measuring radiation to the geodetic target by using the geodetic instrument in order to perform a measurement with respect to the measuring target.

33. The measurement method according to claim 31 wherein detecting the optical state of the at least one identification element of the identifier of the geodetic target comprises producing of a two-dimensional image and detecting the at least one identification element in the two-dimensional image by using electronic image processing.

34. The measurement method according to claim 31 further comprising:

determining an orientation of the geodetic target on the basis of the spatial position of at least two identification elements of the identifier of the geodetic target relative to one another; and correcting the measurement result on the basis of the determined orientation of the geodetic target.

* * * * *